(12) United States Patent
Minagawa et al.

(10) Patent No.: US 9,509,945 B2
(45) Date of Patent: Nov. 29, 2016

(54) AUTOMATIC PROGRAM CLOCK REFERENCE CORRECTION

(75) Inventors: Yusuke Minagawa, Kawasaki (JP); Satoru Yamauchi, SongnamSi (KR)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 1274 days.

(21) Appl. No.: 13/022,800

(22) Filed: Feb. 8, 2011

(65) Prior Publication Data
US 2012/0200772 A1    Aug. 9, 2012

(51) Int. Cl.
*H04N 5/04* (2006.01)
*H04N 7/035* (2006.01)

(52) U.S. Cl.
CPC .................... *H04N 7/0352* (2013.01)

(58) Field of Classification Search
CPC .............. H04N 21/234309; H04N 21/242; H04N 21/23608; H04N 21/4305; H04N 21/440218; H04N 21/23602; H04N 21/64322; H04N 21/6473; H04N 5/33; H04N 7/0352
USPC ...... 375/240, 354; 370/545; 358/1; 704/254; 348/500
See application file for complete search history.

(56) References Cited

U.S. PATENT DOCUMENTS

| | | | |
|---|---|---|---|
| 2005/0190872 A1* | 9/2005 | Seong et al. | 375/354 |
| 2006/0271365 A1* | 11/2006 | Maes et al. | 704/254 |
| 2010/0008385 A1* | 1/2010 | Noronha, Jr. | 370/545 |
| 2010/0328724 A1* | 12/2010 | Sekimoto et al. | 358/1.16 |

OTHER PUBLICATIONS

"TMS320DM6467 Digital Media System-on-Chip", SPRS403G, Texas Instruments Incorporated, Revised Oct. 2010, pp. 1-355.

* cited by examiner

*Primary Examiner* — William C Vaughn, Jr.
*Assistant Examiner* — Naod Belai
(74) *Attorney, Agent, or Firm* — Robert D. Marshall, Jr.; Frank D. Cimino (57) ABSTRACT

A data stream that contains periodic time reference values referenced to a first reference clock is received for transcoding. The received data stream is processed to form an output data stream that contains the periodic time reference values. At least one of the periodic time reference values is adjusted by adding a count value to the at least one periodic reference value to form an adjusted periodic time reference value. The output data stream is transmitted with the adjusted periodic time reference value.

6 Claims, 9 Drawing Sheets

AUTOMATIC PROGRAM CLOCK REFERENCE CORRECTION

FIELD OF THE INVENTION

This invention generally relates to real-time transcoding of data streams, and in particular to data streams in which timing data is inserted in the data stream.

BACKGROUND OF THE INVENTION

The demand for digital imaging products continues to increase. Some examples of applications for digital imaging include video communication, security and surveillance, industrial automation, and entertainment (e.g., DV, HDTV, satellite TV, set-top boxes, Internet video streaming, video gaming devices, digital cameras, cellular telephones, video jukeboxes, high-end displays and personal video recorders). Further, imaging applications are becoming increasingly mobile as a result of higher computation power in handsets, advances in battery technology, and high-speed wireless connectivity.

Image compression, i.e., MPEG (moving pictures experts group) coding, is an essential enabler for digital video products as it enables the storage and transmission of digital video. In general, video compression techniques apply prediction, transformation, quantization, and entropy coding to sequential blocks of pixels, i.e., coding blocks, in a video sequence to compress, i.e., encode, the video sequence. A coding block is a subset of a frame or a portion of a frame, e.g., a slice or a block of 64×64 pixels, in a video sequence and a coding block and a frame may be inter-coded or intra-coded. For encoding, a coding block may be divided into prediction blocks, e.g., 4×4, or 8×8 or 16×16 blocks of pixels. Prediction blocks may be inter-coded or intra-coded as well. In an intra-coded coding block, all prediction blocks are intra-coded. In an inter-coded coding block, the prediction blocks may be either intra-coded or inter-coded.

MPEG-2 is a standard for the generic coding of moving pictures and associated audio information. It describes a combination of lossy video compression and lossy audio data compression methods which permit storage and transmission of movies using currently available storage media and transmission bandwidth. An MPEG transport stream (TS) is a standard format for transmission and storage of audio, video, and data, and is used in broadcast systems such as DVB (digital video broadcasting) and ATSC (advanced television systems committee for digital television). The Transport Stream is specified in MPEG-2 Part 1, Systems (formally known as ISO/IEC standard 13818-1 or ITU-T Rec. H.222.0).

Transport stream specifies a container format encapsulating packetized elementary streams, with error correction and stream synchronization features for maintaining transmission integrity when the signal is degraded. A packet is the basic unit of data in a transport stream. In MPEG-2, it consists of a sync byte, whose value is 0x47, followed by three one-bit flags and a 13-bit Packet Identifier (PID). This is followed by a 4-bit continuity counter. Additional optional transport fields, as signaled in the optional adaptation field, may follow. The rest of the packet consists of payload. Packets are 188 bytes in length, but the communication medium may add some error correction bytes to the packet.

To enable a decoder to present synchronized content, such as audio tracks matching the associated video, at least once each 100 ms a Program Clock Reference, or PCR is transmitted in the adaptation field of an MPEG-2 transport stream packet. The PID with the PCR for an MPEG-2 program is identified by the per_pid value in the associated Program Map Table. The value of the PCR may be used to generate a system timing clock (STC) in the decoder. Timing in MPEG-2 references this clock; for example, the presentation time stamp (PTS) is intended to be relative to the PCR. The first 33 bits are based on a 90 kHz clock. The last 9 are based on a 27 MHz clock. The maximum jitter permitted for the PCR is +/−500 ns.

H.264/MPEG-4 Part 10 or AVC (Advanced Video Coding) is a standard for video compression, and is currently one of the most commonly used formats for the recording, compression, and distribution of high definition video. H.264/MPEG-4 AVC is a block-oriented motion-compensation-based codec standard. The intent of the H.264/AVC project was to create a standard capable of providing good video quality at substantially lower bit rates than previous standards. For example, half or less the bit rate of MPEG-2, H.263, or MPEG-4 Part 2.

BRIEF DESCRIPTION OF THE DRAWINGS

Particular embodiments in accordance with the invention will now be described, by way of example only, and with reference to the accompanying drawings.

DETAILED DESCRIPTION OF EMBODIMENTS OF THE INVENTION

Specific embodiments of the invention will now be described in detail with reference to the accompanying figures. Like elements in the various figures are denoted by like reference numerals for consistency. In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

A method will be described in more detail below to keep accuracy of clock information data (PCR: program clock reference) in transportation of stream data in inter-chip communication. In some cases, a stream of data with the PCR may be transported with a clock that is asynchronous to the PCR, though the PCR is intended to be transported with a system clock synchronized to the PCR (27 MHz). With this method, accuracy of the PCR value can be maintained during transportation of stream data for inter-chip communication with an asynchronous clock and also for inter-chip communication with handshake, such as PCI (peripheral component interconnect), or other known interconnect standards.

The MPEG-2 compression standard has been widely deployed in video distribution infrastructures, such as cable and satellite networks, as well as in several consumer applications, such as DVDs and DVRs. For many years, end-to-end systems have existed, with several million interoperable encoders, multiplexers and set-top boxes deployed. However, it is now desirable to transcode MPEG-2 format data streams to other compression standards.

Improvements in compression techniques have resulted in mature new standards such as H.264 that offer significant bit rate gains of 30 percent to 50 percent over MPEG-2. However, investments made in legacy devices that can only handle the MPEG-2 format and the existence of large amounts of content that was created using MPEG-2 means that multiple standards will coexist for several years before the eventual conversion to a single standard. Emerging internet protocol television (IPTV) deployments of video over bandwidth constrained last mile to the home will result in part of the content distribution chain migrating to H.264.

New applications, such as high-definition video and real-time broadcast video over handheld mobile devices, require that the same content be made available in several spatial resolutions and frame rate formats. This can be handled by recreating the same content in several formats. Alternatively, it will be more efficient to create the content once and transcode it to different formats and resolutions as needed.

In real-time trans-coding system, the stream output clock needs to be synchronized to the 27 MHz system clock (PCR recovered) in order to keep accuracy of the PCR value. It is difficult to implement a real-time trans-coding system with stream output using a low frequency stream output clock or some other handshake protocol.

As will be described in more detail below, embodiments of the invention configure an offset counter that can measure offset time to each next event time for output of the stream data. The counter value is added to each PCR value that is output. Measuring only the offset requires a small counter and minimal additional logic gates.

Figure 1:
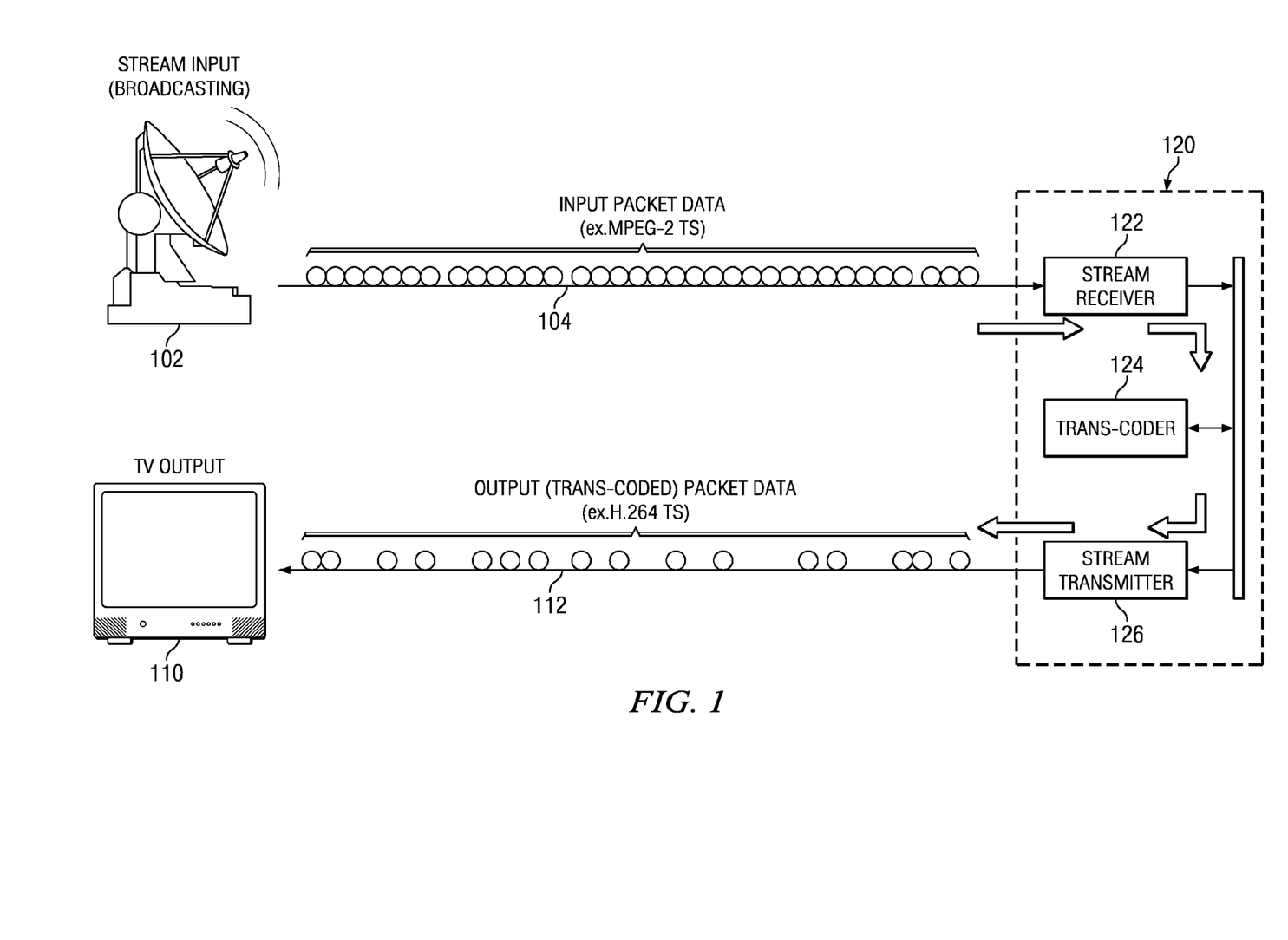
FIG. 1 shows a block diagram of a digital system in accordance with one or more embodiments of the invention.

FIG. 1 shows a block diagram of a digital system in accordance with one or more embodiments of the invention. Inter-chip transportation of stream data with clock information, such as PCR, may be found in various commercial trans-coder systems 120. Trans-coder system 120 includes a stream receiver module 122, a stream transmitter module 126 and a transcoder engine 124. There may also be other modules coupled to transcoder system 120, such as a host processor that may control overall system operation, provide a user interface, etc. Transcoder system 120 may be based on a Davinci-HD transcoder, available from Texas Instruments, Inc, for example. An exemplary Davinci-HD transcoder is a TMS320DM6467 Digital Media System-on-Chip, which is described in more detail in SPRS403G, revised October 2010, which is incorporated by reference herein. The operation of transcoding between compression standards in general is well known and will not be described in detail herein.

Transportation of stream data may be executed in a packet format called transport stream packet (TS packet). TS packet has several categories such as video, audio, channel information or clock information (PCR). In this example, the source of stream data 104 is a TV broadcast source 102, which may be a satellite or a cable head, for example. Stream data 104 is being broadcast using MPEG-2 compression. Input data stream 104 is received by stream receiver 122, transcoded in real time by transcoder engine 124 into H.264 compression and then transmitted as output data stream 112 by stream transmitter 126. The H.264 output data stream 112 may be coupled to a television device 110 or other type of display device.

PCR is a counter value which is driven by a 27 MHz clock by the initiator of the stream data, broadcast source 102. In order for the audio and video channel to remain in synchronization, the system counter value used to insert timing information into the output data stream 112 should be the same as PCR. So, arrival timing of PCR packet and PCR value of the PCR packet are very important.

Figure 2:
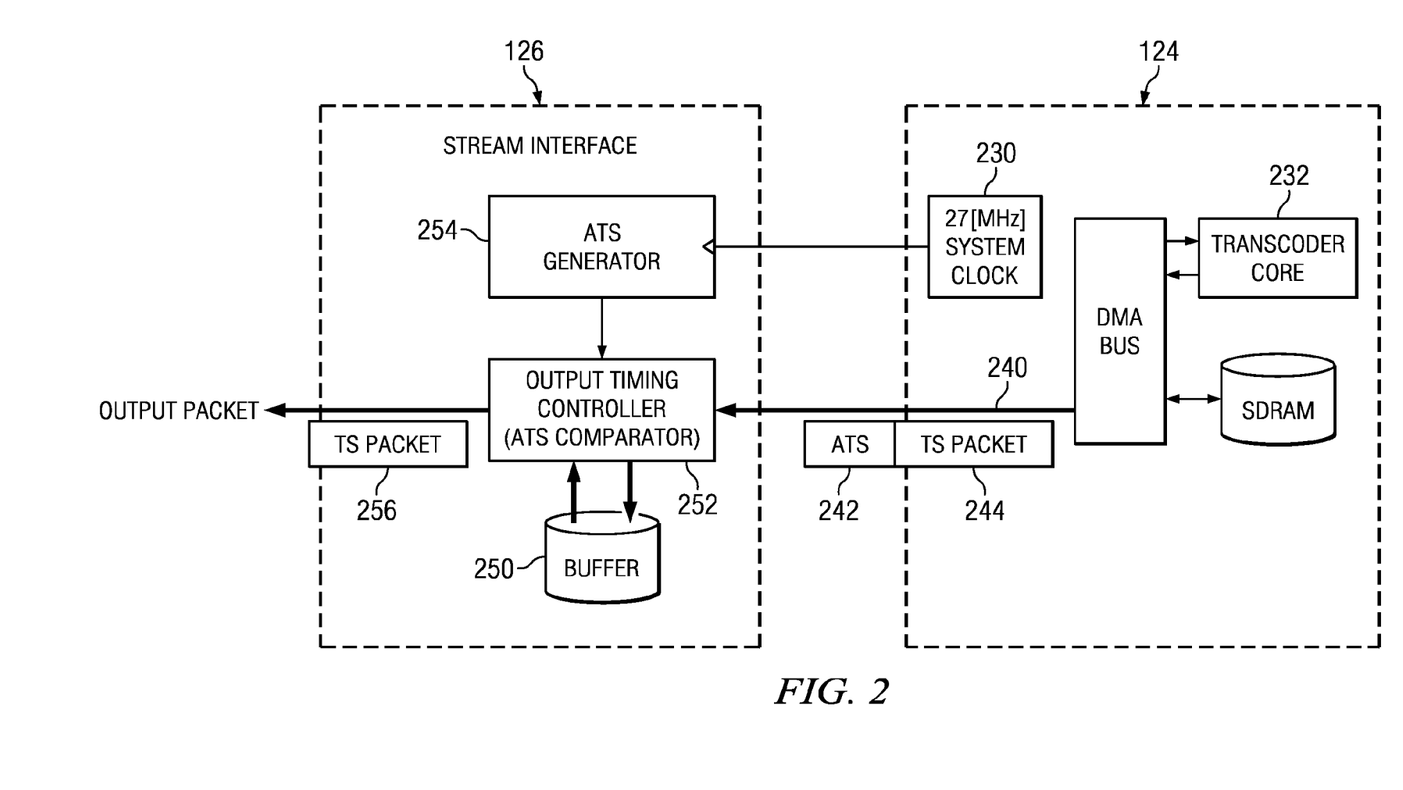
FIG. 2 is a block diagram that illustrates operation of the transcoder of FIG. 1.

FIG. 2 is a block diagram that illustrates operation of transcoder system 120 of FIG. 1. Transcoder system 120 adjusts a 27 MHz system clock generator 230 based on the PCR values and arrival timing of the PCR packet so that the system clock is synchronized to the PCR value.

After transcoding received data stream 104 by transcoder core 232, the result data is transferred from the transcoder engine 124 to stream transmitter 126 via an inter-chip communication bus 240. Output timing of all packets is managed by timestamp, referred to as an absolute time stamp (ATS). Time stamps 242 are inserted in the transcoded data stream of data packets 244 and the resulting data stream is stored in buffer 250 that is coupled to an output timing controller 252 within stream transmitter 126. Each packet stored in buffer 250 is then transmitted as an output packet 256 when a counter value of ATS generator 254 is equal to an ATS value 242 of the packet stored in the buffer.

Figure 3:
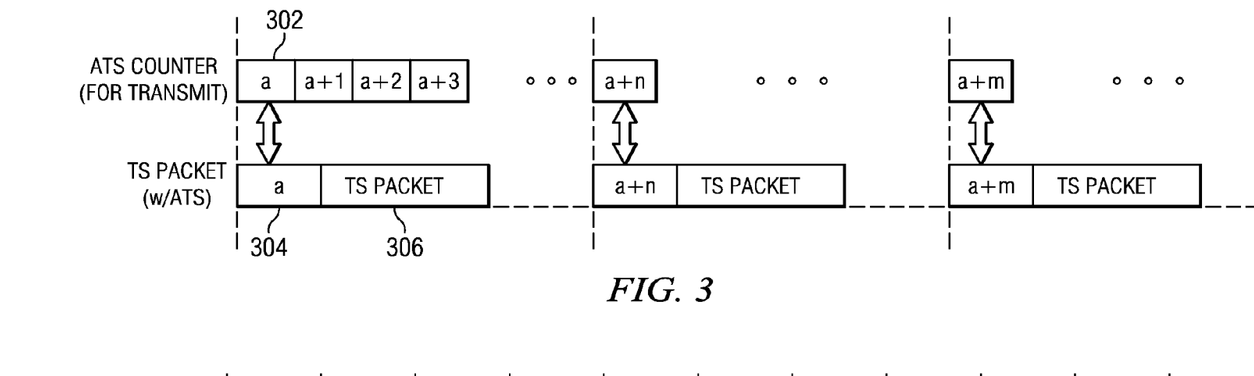
FIG. 3 is a timing diagram illustrating operation of the stream transmitter of FIG. 1.

FIG. 3 is a timing diagram illustrating operation of stream transmitter 126. As explained above, each time ATS counter 254 is incremented, a next packet who's ATS matches the current ATS count is transmitted from buffer 250. For example, when the ATS value generated by ATS counter 254 is "a" as indicated at 302, a packet 306 whose ATS 304 has a value of "a" is transmitted from buffer 250 by stream transmitter 126.

As mentioned above, at least once each 100 ms a Program Clock Reference (PCR) is transmitted in the adaptation field of an MPEG-2 transport stream packet. The PID with the PCR for an MPEG-2 program is identified by the per_pid value in the associated Program Map Table. The value of the PCR may be used to generate a system timing clock (STC) in the decoder. Timing in MPEG-2 references this clock; for example, the presentation time stamp (PTS) is intended to be relative to the PCR. The first 33 bits are based on a 90 kHz clock. The last 9 are based on a 27 MHz clock. The maximum jitter permitted for the PCR is +/−500 ns.

Figure 4:
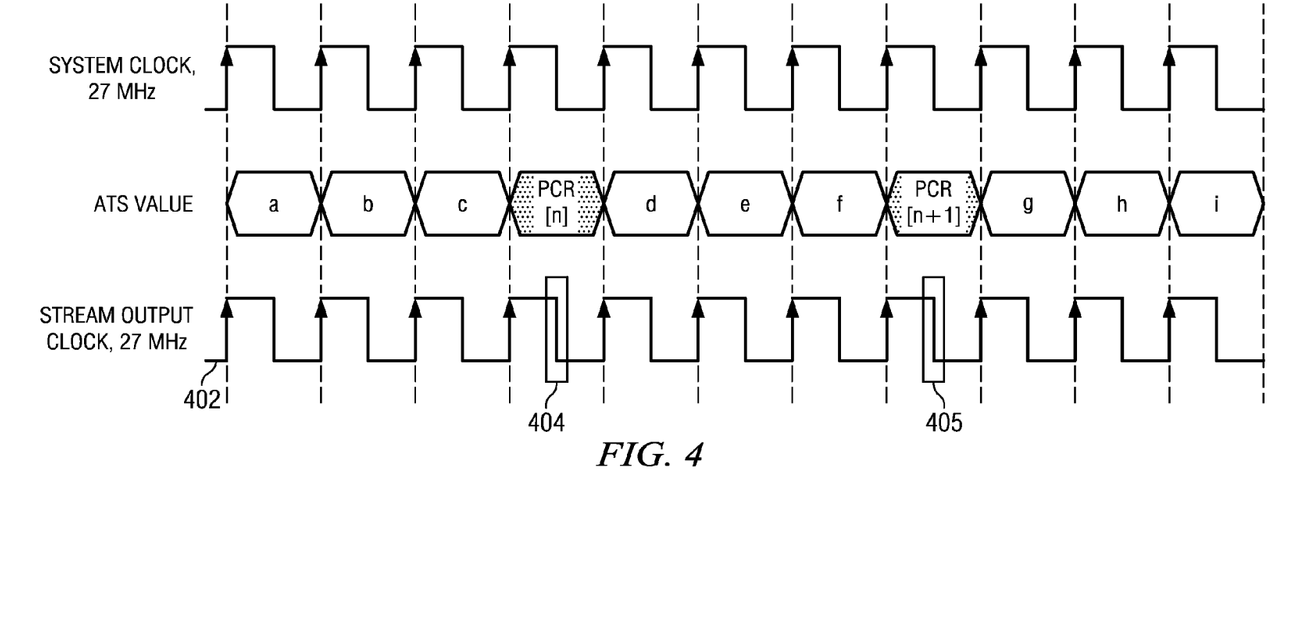
FIG. 4 is a timing diagram illustrating ideal synchronized clock operation.

In real-time trans-coding, the PCR packet needs to be output with accurate timing. In order to keep accuracy of PCR, the stream output clock needs to be a perfectly synchronized multiple to the system 27 MHz. FIG. 4 is a timing diagram illustrating ideal synchronized clock operation. In this case, the stream output clock 402 is 27 MHz. Each PCR packet is synchronized with the output clock, as indicated at 404 and 405.

Figure 5:
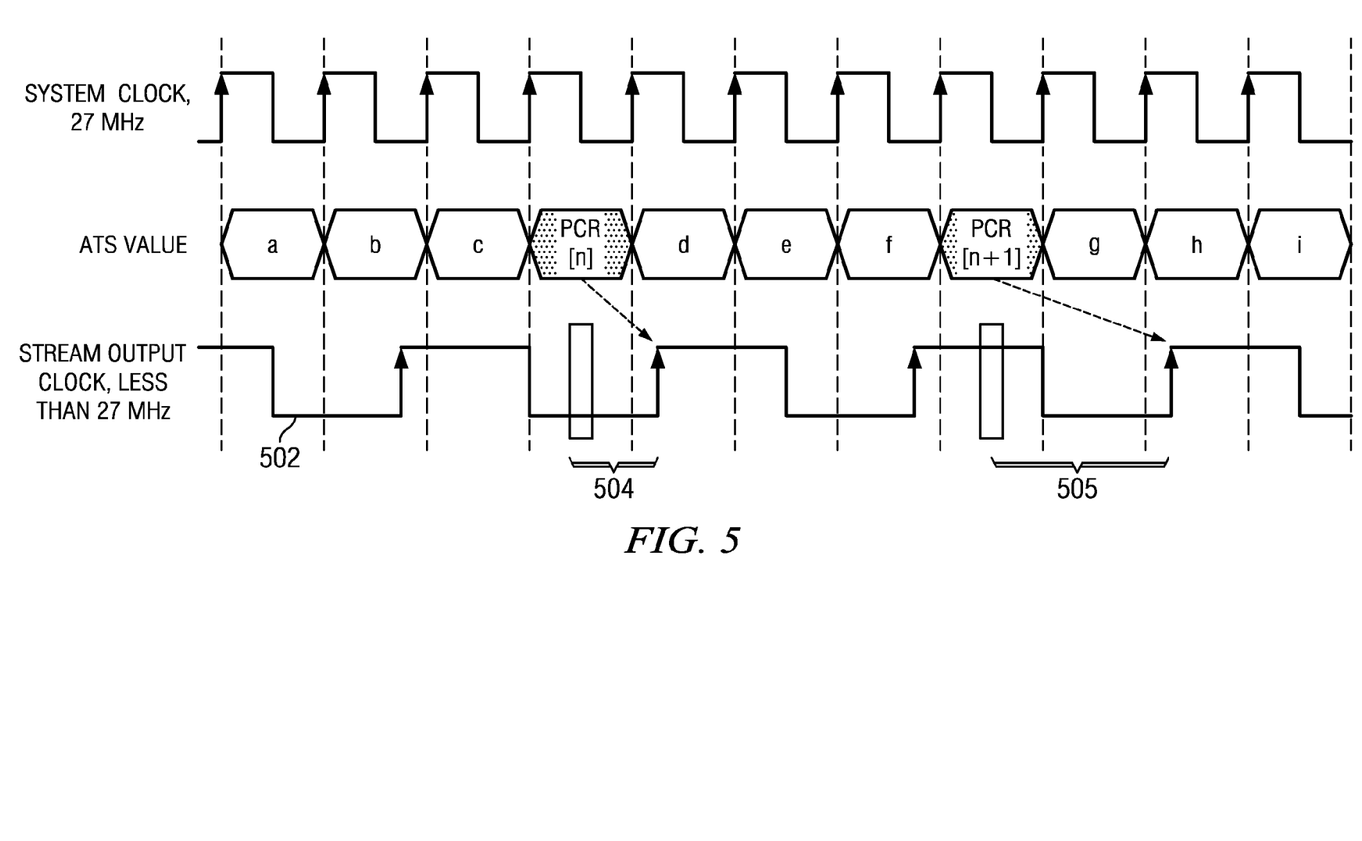
FIG. 5 is timing diagram illustrating asynchronous clock operation.

FIG. 5 is timing diagram illustrating asynchronous clock operation. In this case, system clock signal 502 has a lower frequency than the 27 MHz system clock, which may be desirable for an H.264 output data stream, for example. If not synchronized to the system 27 MHz clock or lower frequency multiple of the system 27 MHz clock, accuracy of PCR value may be lost as indicated at 504, 505 due to the difference in time between the arrival time of the PCR packet and an edge of the output stream clock 502.

Figure 6:
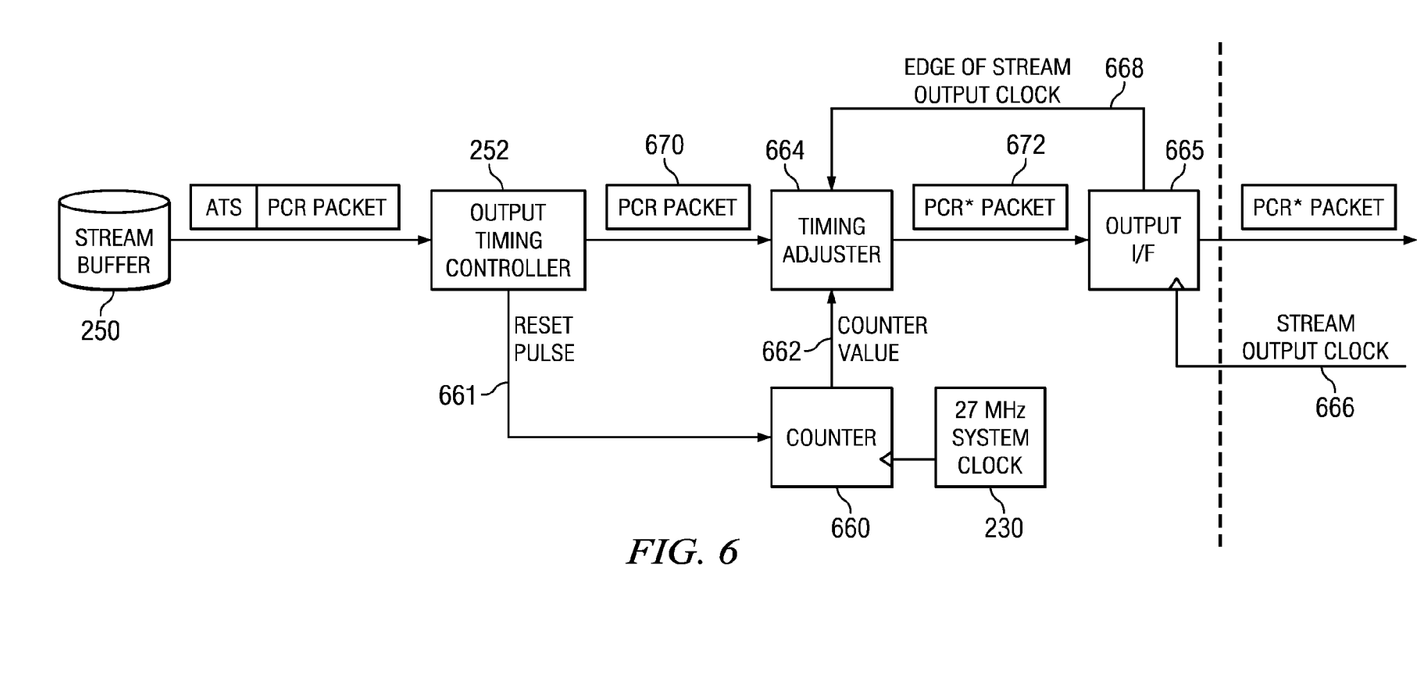
FIG. 6 is a block diagram illustrating a mechanism for automatic correction of PCR timing.

FIG. 6 is a block diagram illustrating a mechanism for automatic correction of PCR timing. In order to improve PRC packet timing accuracy, embodiments of the invention implement a method to change a PCR value automatically in order to keep accuracy of the PCR value in inter-chip transportation of stream data with an asynchronous output clock. This may be used in a system in which the stream output clock has a lower frequency than the 27 MHz system clock, for example.

As described above, each packet stored in buffer 250 is transmitted as an output packet when a counter value of ATS generator 254 (see FIG. 2) is equal to an ATS value of the packet stored in the buffer, as determined by output timing controller 252. When output timing for a PCR packet comes, such as PCR packet 670, a reset pulse 661 is asserted to counter module 660. Counter module 660 has an internal counter driven by the 27 MHz system clock 230 that is synchronized to PCR packets received in input data stream 104 (see FIG. 1). The counter value 662 is coupled to timing adjuster module 664. Each time counter module 660 detects reset pulse, the internal counter is reset.

Timing adjuster 664 checks for a rising edge of stream output clock 666. In this embodiment, output interface 665 is clocked by stream output clock and asserts an edge of stream clock signal 668 for each rising edge of stream output clock 666. Each time the timing adjuster detects rising edge of the stream output clock as indicated by signal 668, the current counter value 662 from counter 660 is added to the current PCR value, as contained in PCR packet 670, for example, to form a corrected PCR value 672. The counter value 662 may be regarded as an offset time of the stream output clock edge from the correct timing of the PCR packet.

Figure 7:
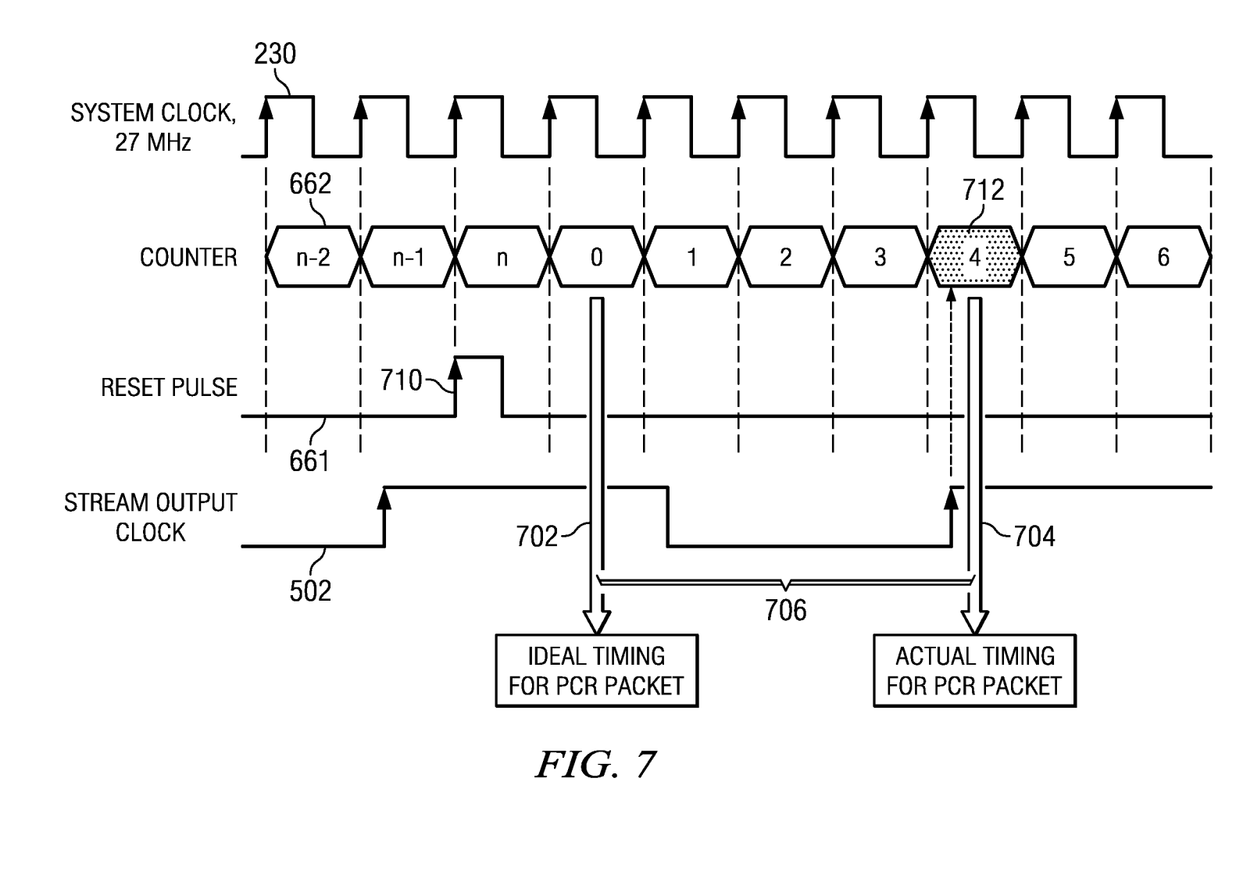
FIG. 7 is a timing diagram illustrating automatic PCR timing correction.

FIG. 7 is a timing diagram illustrating automatic PCR timing correction. Receipt of a PCR packet by output timing controller 252 causes reset signal 661 to be asserted, as, indicated at 710. An ideal time to output the PCR packet would then be as indicated at 702; however, the asynchronous stream output clock signal 502 does not have an edge in proximity to time 702. In response to reset pulse 710, counter 660 is reset and begins to count, referenced to 27 MHz clock 230. At time 704 an edge is detected in stream output clock 704. At time 704, counter value 662 is "4" in this example. Therefore, a count value of "4" is added to the current PCR 670 value to form corrected PCR 672, see FIG. 6. The location of PCR 670 in the output data stream is also adjusted from timing location 702, which was the ideal timing location for PCR 672, to time location 704, which is now the actual timing location for PCR 672 in the output data stream. Note that the position in the output data stream of the adjusted PCR is adjusted by an offset time 706 that is the difference between time 704 and time 702 and is proportional to the count value. The count value indicates a number of periods of the system reference clock that equals the offset time.

With this method, real-time trans-coding and transportation of stream data may be accomplished while using a lower frequency stream output clock or a stream output clock that is asynchronous to 27 MHz system clock. Additionally, this method may be also applied to transportation with handshake protocols such as PCI.

Figure 8:
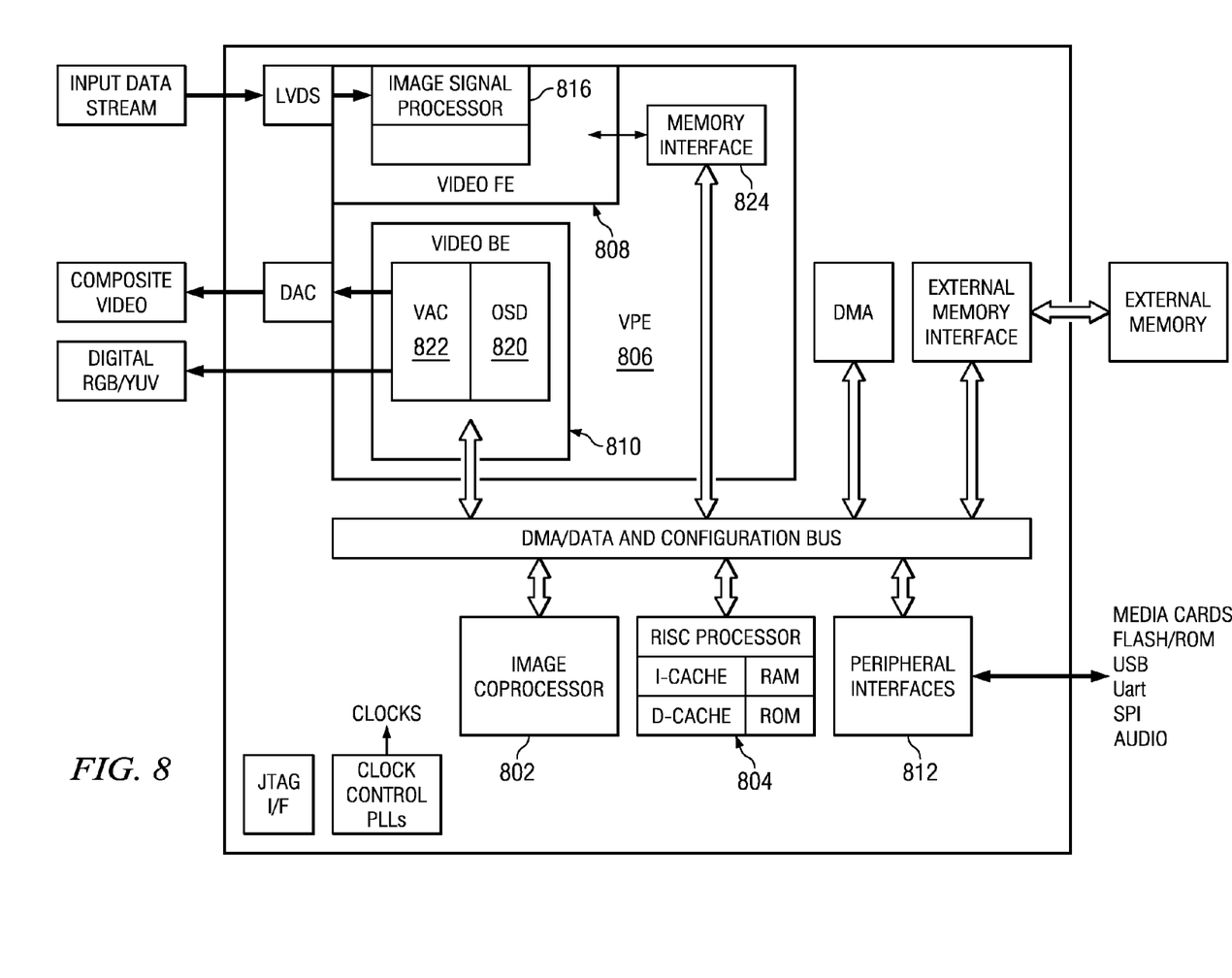
FIGS. 8-10 show illustrative digital systems in accordance with one or more embodiments of the invention.

FIG. 8 shows a digital system suitable for an embedded system (e.g., a set top box) in accordance with one or more embodiments of the invention that includes, among other components, a DSP-based image coprocessor (ICP) 802, a RISC processor 804, and a video processing engine (VPE) 806 that may be configured to perform methods as described herein. The RISC processor 804 may be any suitably configured RISC processor. The VPE 806 includes a configurable video processing front-end (Video FE) 808 input interface used for video capture from imaging peripherals such as a cable receiver, a satellite receiver, etc., a configurable video processing back-end (Video BE) 810 output interface used for display devices such as SDTV displays, digital LCD panels, HDTV video encoders, etc, and memory interface 824 shared by the Video FE 808 and the Video BE 810. The digital system also includes peripheral interfaces 812 for various peripherals that may include a multi-media card, an audio serial port, a Universal Serial Bus (USB) controller, a serial port interface, etc.

The Video FE 808 includes an image signal processor (ISP) 816. The ISP 816 provides an interface to digital video sources. More specifically, the ISP 816 may accept raw image/video data from a sensor (CMOS or CCD) and can accept YUV video data in numerous formats. The ISP 816 also includes a parameterized image processing module with functionality to generate image data in a color format (e.g., RGB) from raw CCD/CMOS data. The ISP 816 is customizable for each sensor type and supports video frame rates for preview displays of captured digital images and for video recording modes.

The Video BE 810 includes an on-screen display engine (OSD) 820 and a video analog encoder (VAC) 822. The OSD engine 820 includes functionality to manage display data in various formats for several different types of hardware display windows and it also handles gathering and blending of video data and display/bitmap data into a single display window before providing the data to the VAC 822 in YCbCr format. The VAC 822 includes functionality to take the display frame from the OSD engine 820 and format it into the desired output format and output signals required to interface to display devices. The VAC 822 may interface to composite NTSC/PAL video devices, S-Video devices, digital LCD devices, high-definition video encoders, DVI/HDMI devices, etc.

The memory interface 824 functions as the primary source and sink to modules in the Video FE 808 and the Video BE 810 that are requesting and/or transferring data to/from external memory. The memory interface 824 includes read and write buffers and arbitration logic.

The ICP 802 includes functionality to perform the computational operations required for video encoding and other processing of captured images. The video encoding standards supported may include one or more of the JPEG standards, the MPEG standards, and the H.26x standards. In one or more embodiments of the invention, the ICP 802 is configured to perform computational operations of methods for prediction mode dependent transform coding and decoding as described herein.

The ICP may be configured to perform real-time transcoding of an input data stream. As was described above in more detail, in real-time trans-coding system, the stream output clock needs to be synchronized to the 27 MHz system clock (PCR recovered) in order to keep accuracy of the PCR value. The ICP is configured to provide an offset counter that can measure offset time to each next event time for output of the stream data, as described in more detail above. The counter value is added to each PCR value that is output. Measuring only the offset requires a small counter.

Figure 9:
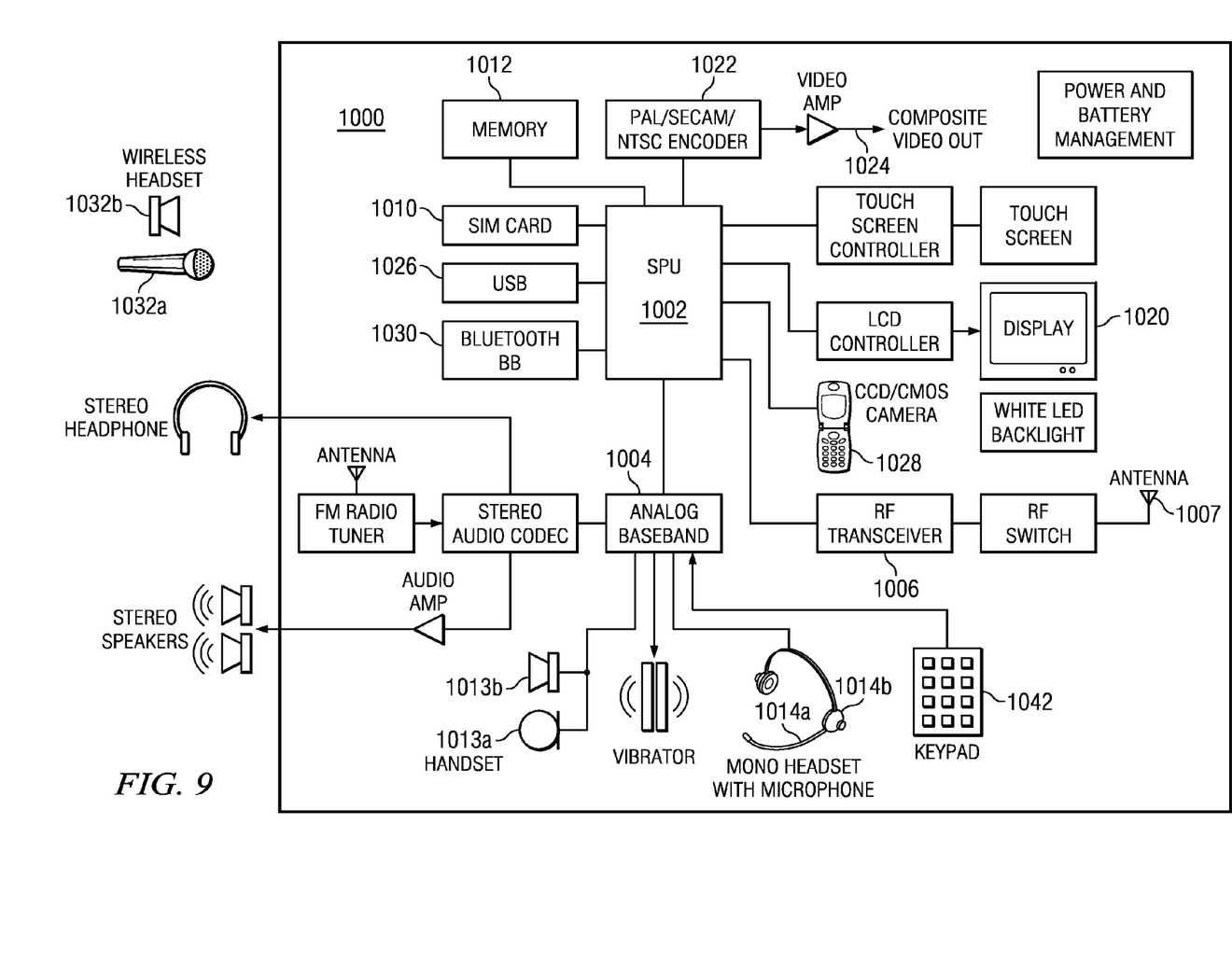

FIG. 9 is a block diagram of a digital system (e.g., a mobile cellular telephone) 1000 that may be configured transcode an input data stream from the cellular network, for example, as described herein. The signal processing unit (SPU) 1002 includes a digital signal processing system (DSP) that includes embedded memory and security features. The analog baseband unit 1004 receives a voice data stream from handset microphone 1013*a* and sends a voice data stream to the handset mono speaker 1013b. The analog baseband unit 1004 also receives a voice data stream from the microphone 1014a and sends a voice data stream to the mono headset 1014b. The analog baseband unit 1004 and the SPU 1002 may be separate ICs. In many embodiments, the analog baseband unit 1004 does not embed a programmable processor core, but performs processing based on configuration of audio paths, filters, gains, etc being setup by software running on the SPU 1002.

The display 1020 may also display pictures and video sequences received from a local camera 1028, or from other sources such as the USB 1026 or the memory 1012. The SPU 1002 may also send a picture or a video sequence to the display 1020 that is received from various sources such as the cellular network via the RF transceiver 1006 or the camera 1026. The SPU 1002 may also send a picture or a video sequence to an external video display unit via the encoder unit 1022 over a composite output terminal 1024. The encoder unit 1022 may provide encoding according to PAL/SECAM/NTSC video standards.

The SPU 1002 includes functionality to perform the computational operations required for image encoding and decoding. The video encoding standards supported may include, for example, one or more of the JPEG standards, the MPEG standards, and the H.26x standards. In one or more embodiments of the invention, the SPU 1002 is configured perform real-time transcoding of a received data stream, as described herein. Software instructions implementing the transform coding and/or decoding may be stored in the memory 1012 and executed by the SPU 1002, for example, as part of encoding video sequences captured by the local camera 1028 and/or as part of decoding a received video sequence.

Figure 10:
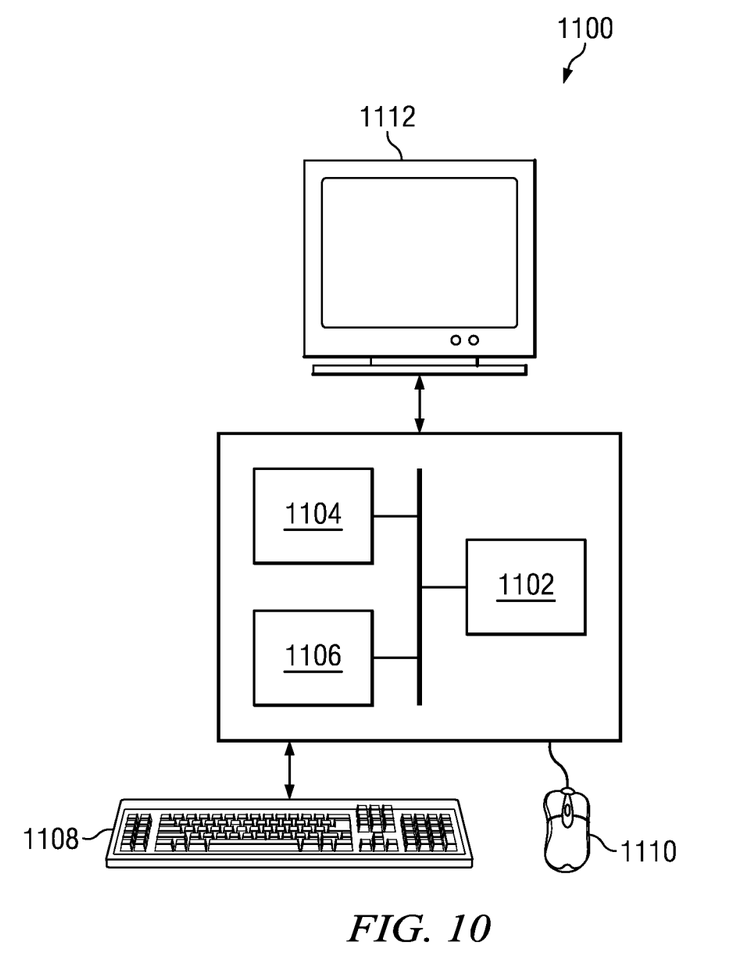

FIG. 8 shows a digital system 1100 (e.g., a personal computer) that includes a processor 1102, associated memory 1104, a storage device 1106, and numerous other elements and functionalities typical of digital systems (not shown). In one or more embodiments of the invention, a digital system may include multiple processors and/or one or more of the processors may be digital signal processors. The digital system 1100 may also include input means, such as a keyboard 1108 and a mouse 1110 (or other cursor control device), and output means, such as a monitor 1112 (or other display device). Those skilled in the art will appreciate that the input and output means may take other forms. The digital system 1100 may also include an image capture device (not shown) that includes circuitry (e.g., optics, a sensor, readout electronics) for capturing video sequences or still pictures. The digital system 1100 may include an embodiment of a video encoder for encoding the captured video sequences. The digital system 1100 may be connected to a network 1114 (e.g., a local area network (LAN), a wide area network (WAN) such as the Internet, a cellular network, any other similar type of network and/or any combination thereof) via a network interface connection (not shown). Encoded video sequences may be received by the digital system 1100 via the network and/or via a computer readable medium. The digital system 1100 may include an embodiment of a real-time transcoder, as described herein, that may be used to transcode an input data stream received via the internet into an alternate compression format for display on display device 1112.

Further, those skilled in the art will appreciate that one or more elements of the aforementioned digital system 1100 may be located at a remote location and connected to the other elements over a network. Further, embodiments of the invention may be implemented on a distributed system having a plurality of nodes, where each portion of the system and software instructions may be located on a different node within the distributed system. In one embodiment of the invention, the node may be a digital system. Alternatively, the node may be a processor with associated physical memory. The node may alternatively be a processor with shared memory and/or resources.

Software instructions to perform embodiments of the invention may be stored on a computer readable medium such as a compact disc (CD), a diskette, a tape, a file, memory, or any other computer readable storage device. The software instructions may be distributed to the digital system 1100 via removable computer readable media (e.g., floppy disk, optical disk, flash memory, USB key), via a transmission path from computer readable media on another digital system, etc.

Other Embodiments

While the invention has been described with respect to a limited number of embodiments, those skilled in the art, having benefit of this disclosure, will appreciate that other embodiments can be devised which do not depart from the scope of the invention as disclosed herein. For example, in another embodiment, event timing for PCR packet in the data output is equal to the accomplishment of a handshake protocol in inter-chip communication. The inter-chip communication may be by PCI, UHPI or any other protocol useful for inter-chip communication. Accordingly, the scope of the invention should be limited only by the attached claims. It is therefore contemplated that the appended claims will cover any such modifications of the embodiments as fall within the true scope and spirit of the invention.

In the description herein, some terminology is used that is specifically defined in the MPEG coding standard and/or is well understood by those of ordinary skill in the art in image coding. Definitions of these terms are not provided in the interest of brevity. Further, this terminology is used for convenience of explanation and should not be considered as limiting embodiments of the invention to the MPEG standard. One of ordinary skill in the art will appreciate that different terminology may be used in other image encoding standards without departing from the described functionality.

In a video transcoder system, the video transcoder engine may perform encoding and decoding in accordance with one or more video compression standards such as, for example, the Moving Picture Experts Group (MPEG) video compression standards, e.g., MPEG-1, MPEG-2, and MPEG-4, the ITU-T video compressions standards, e.g., H.263 and H.264, the Society of Motion Picture and Television Engineers (SMPTE) 421 M video CODEC standard (commonly referred to as "VC-1"), the video compression standard defined by the Audio Video Coding Standard Workgroup of China (commonly referred to as "AVS"), ITU-T/ISO High Efficiency Video Coding (HEVC) standard, etc.

Although the invention finds particular application to Digital Signal Processors (DSPs), implemented, for example, in an Application Specific Integrated Circuit (ASIC), it also finds application to other forms of processors. An ASIC may contain one or more megacells which each include custom designed functional circuits combined with pre-designed functional circuits provided by a design library.

Embodiments of the decoders and methods described herein may be provided on any of several types of digital systems: digital signal processors (DSPs), general purpose programmable processors, application specific circuits, or systems on a chip (SoC) such as combinations of a DSP and a reduced instruction set (RISC) processor together with various specialized accelerators. A stored program in an onboard or external (flash EEP) ROM or FRAM may be used to implement aspects of the video signal processing. Analog-to-digital converters and digital-to-analog converters provide coupling to the real world, modulators and demodulators (plus antennas for air interfaces) can provide coupling for waveform reception of image data being broadcast over the air by satellite, TV stations, cellular networks, etc or via wired networks such as the Internet.

The techniques described in this disclosure may be implemented in hardware, software, firmware, or any combination thereof. If implemented in software, the software may be executed in one or more processors, such as a microprocessor, application specific integrated circuit (ASIC), field programmable gate array (FPGA), or digital signal processor (DSP). The software that executes the techniques may be initially stored in a computer-readable medium such as compact disc (CD), a diskette, a tape, a file, memory, or any other computer readable storage device and loaded and executed in the processor. In some cases, the software may also be sold in a computer program product, which includes the computer-readable medium and packaging materials for the computer-readable medium. In some cases, the software instructions may be distributed via removable computer readable media (e.g., floppy disk, optical disk, flash memory, USB key), via a transmission path from computer readable media on another digital system, etc.

Certain terms are used throughout the description and the claims to refer to particular system components. As one skilled in the art will appreciate, components in digital systems may be referred to by different names and/or may be combined in ways not shown herein without departing from the described functionality. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" and derivatives thereof are intended to mean an indirect, direct, optical, and/or wireless electrical connection. Thus, if a first device couples to a second device, that connection may be through a direct electrical connection, through an indirect electrical connection via other devices and connections, through an optical electrical connection, and/or through a wireless electrical connection.

Although method steps may be presented and described herein in a sequential fashion, one or more of the steps shown and described may be omitted, repeated, performed concurrently, and/or performed in a different order than the order shown in the figures and/or described herein. Accordingly, embodiments of the invention should not be considered limited to the specific ordering of steps shown in the figures and/or described herein.

It is therefore contemplated that the appended claims will cover any such modifications of the embodiments as fall within the true scope and spirit of the invention.

What is claimed is:

1. A method for transcoding a data stream, the method comprising:
   receiving the data stream, wherein the data stream contains periodic time reference values referenced to a first reference clock;
   processing the received data stream to form transcoded output data stream;
   adjusting at least one of the periodic time reference values in the transcoded output data stream by
      resetting a counter upon each reaching of a time for outputting an output packet of the transcoded output data stream,
      counting clock pulses of the first reference clock in the counter, and
      adding a count value of the counter to a current received data stream periodic reference value upon each rising edge of a second reference clock having a frequency lower than the first reference clock to form an adjusted periodic time reference value; and
   transmitting the output data stream in synchronism with the second reference clock, wherein the output data stream contains the adjusted periodic time reference value.

2. The method of claim 1, wherein processing the received data stream comprises transcoding the received data stream from a first compression format to a different compression format.

3. The method of claim 1, wherein transmitting the output data stream uses an inter-chip communication protocol, wherein a position in the output data stream of the adjusted time reference value is adjusted by an offset time equal to the accomplishment of a handshake protocol in the inter-chip communication protocol.

4. A transcoder system, comprising:
   a receiver configured to receive a data stream, wherein the data stream contains periodic time reference values referenced to a first reference clock;
   a counter receiving the first reference clock counting clock pulsed of the first reference clock, the counter reset upon each reaching of a time for outputting an output packet of the transcoded output data stream;
   a transcoder engine coupled to the receiver, wherein the transcoder engine is configured to process the received data stream to form transcoded output data stream;
   a timing adjuster coupled to receive the output data stream and to receive a count value of the counter, the timing adjuster configured to adjust at least one of the periodic time reference values by adding the count value of the counter to a current received data stream periodic reference value upon each rising edge of a second reference clock having a frequency lower than the first reference clock to form an adjusted periodic time reference value; and
   a transmitter coupled to the timing adjuster for transmitting the output data stream in synchronism with the second reference clock, wherein the output data stream contains the adjusted periodic time reference value.

5. The transcoder system of claim 4 being a cellular handset.

6. A transcoder system, comprising:
   means for receiving a data stream, wherein the data stream contains periodic time reference values referenced to a first reference clock;
   means for processing the received data stream to form a transcoded output data stream;
   means for adjusting at least one of the periodic time reference values in the transcoded output data stream by
      resetting a counter upon each reaching of a time for outputting an output packet of the transcoded output data stream,
      counting clock pulses of the first reference clock in the counter, and adding a count value of the counter to a current received data stream periodic reference value upon each rising edge of a second reference clock having a frequency lower than the first reference clock to form an adjusted periodic time reference value; and
means for transmitting the output data stream in synchronism with the second reference clock, wherein the output data stream contains the adjusted periodic time reference value.

* * * * *